US012148585B2

(12) United States Patent
Balasubramanian et al.

(10) Patent No.: US 12,148,585 B2
(45) Date of Patent: Nov. 19, 2024

(54) VACUUM INTERRUPTER CONDUCTOR ASSEMBLY WITH INTEGRATED THOMSON COIL

(71) Applicant: EATON INTELLIGENT POWER LIMITED, Dublin (IE)

(72) Inventors: Ganesh Kumar Balasubramanian, Horseheads, NY (US); Santhosh Kumar Chamarajanagar Govinda Nayaka, Moon Township, PA (US); Robert Michael Slepian, Murrysville, PA (US); Xin Zhou, Wexford, PA (US); Jayaraman Muniyappan, Pernambut (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 154 days.

(21) Appl. No.: 18/086,126

(22) Filed: Dec. 21, 2022

(65) Prior Publication Data

US 2024/0212958 A1 Jun. 27, 2024

(51) Int. Cl.
*H01H 33/666* (2006.01)
*H01H 3/22* (2006.01)

(52) U.S. Cl.
CPC ........ *H01H 33/6662* (2013.01); *H01H 3/222* (2013.01)

(58) Field of Classification Search
CPC ...... H01H 33/6662; H01H 3/222; H01H 3/22; H01H 33/666; H01H 33/285
See application file for complete search history.

(56) References Cited

U.S. PATENT DOCUMENTS 6,611,413 B2 * 8/2003 Takeuchi ............. H01H 33/285 361/139
10,923,298 B1 * 2/2021 Chen .................. H01H 33/6662
(Continued)

FOREIGN PATENT DOCUMENTS

WO 2015/172824 A1 11/2015
WO 2016/108613 A1 7/2016

OTHER PUBLICATIONS

European Patent Office "International Search Report and Written Opinion" for corresponding International (PCT) Appl. No. PCT/EP2023/025549, dated Apr. 2, 2024, 11 pp.

*Primary Examiner* — Bernard Rojas
(74) *Attorney, Agent, or Firm* — Eckert Seamans Cherin & Mellott, LLC

(57) ABSTRACT

An actuator for opening the separable contacts of a circuit interrupter integrates a Thomson coil arrangement into the movable and stationary conductor assemblies. A movable separable contact is coupled to one end of the movable conductor, and a stationary separable contact is coupled to one end of the stationary conductor. The movable and stationary conductors are each formed with a collar positioned near the respective movable and stationary separable contacts. The actuator further includes a coil seated within a coil housing, and the coil housing is coupled to the stationary conductor collar. A conductive member shaped as a cup and structured to be actuated by the coil is coupled to the movable conductor collar, such that the rim of the cup faces the coil. A housing is positioned around the conductive member cup body with bellows and coupled to the coil housing, forming a vacuum chamber around the separable contacts.

10 Claims, 6 Drawing Sheets

(56) References Cited

U.S. PATENT DOCUMENTS

| | | | | |
|---|---|---|---|---|
| 2020/0411261 | A1 | 12/2020 | Zhou et al. | |
| 2020/0411262 | A1* | 12/2020 | Zhou | H01H 50/443 |
| 2022/0344115 | A1* | 10/2022 | Das | H01H 1/66 |
| 2024/0013992 | A1* | 1/2024 | Chen | H01H 33/36 |
| 2024/0234064 | A1* | 7/2024 | Muniyappan | H01H 89/00 |

* cited by examiner

VACUUM INTERRUPTER CONDUCTOR ASSEMBLY WITH INTEGRATED THOMSON COIL

FIELD OF THE INVENTION

The disclosed concept relates generally to circuit interrupters, and in particular, to mechanisms for opening separable contacts of circuit interrupters at high speeds.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit interrupters typically include mechanically separable electrical contacts, which operate as a mechanical switch. When the separable contacts are in a closed state such that they are in contact with one another, current is able to flow through any circuits connected to the circuit interrupter. When the separable contacts are in an open state such that they are physically separated from one another, current is prevented from flowing through any circuits connected to the circuit interrupter. The separable contacts may be operated either manually by way of an operator handle, remotely by way of an electrical signal, or automatically in response to a detected fault condition. Typically, such circuit interrupters include an actuator designed to rapidly open or close the separable contacts, and a trip mechanism, such as a trip unit, which can sense a number of fault conditions and automatically trip the actuator to open the separable contacts upon sensing a fault condition.

Hybrid circuit interrupters employ a power electronic interrupter in addition to the mechanical separable contacts. The power electronic interrupter is connected in parallel with the mechanical contacts, and comprises electronics structured to commutate current after a fault is detected. Once current is commutated from the mechanical switch to the power electronic interrupter, the mechanical separable contacts are able to separate with a reduced risk of arcing. It is advantageous to commutate as much current as possible to the electronic branch as quickly as possible and to open the mechanical separable contacts at fast speeds in order to limit the let-through current during a fault condition.

Mechanical separable contacts typically comprise one stationary contact disposed at the end of a stationary electrode stem, and one movable contact disposed at the end of a movable electrode stem, with the electrode stem being a component of a larger movable conductor assembly. The force required to open mechanical separable contacts quickly can be significant due to the mass of the movable conductor assembly that must be driven open in order to separate the separable contacts during a fault condition. Thomson coil actuators are noted for their ability to open mechanical separable contacts at very high speeds, and are often employed in hybrid circuit interrupters. However, because the lapse of any time between the occurrence of a fault condition and the opening of the mechanical separable contacts leads to at least some current passing through the mechanical separable contacts, there is always a need for actuators that can open mechanical separable contacts at higher speeds than available actuators can.

There is thus room for improvement in mechanisms for opening separable contacts of circuit interrupters at high speeds.

SUMMARY OF THE INVENTION

These needs, and others, are met by an actuator for opening the separable contacts of a circuit interrupter that integrates a Thomson coil arrangement into both the movable and stationary conductor assemblies, rather than just the movable conductor assembly. A movable separable contact is coupled to one end of the movable conductor, and a stationary separable contact is coupled to one end of the stationary conductor. The movable and stationary conductors are each formed with a collar positioned near the respective movable and stationary separable contacts. The actuator further includes a coil seated within a coil housing, and the coil housing is coupled to the stationary conductor collar. A conductive member shaped as a cup and structured to be actuated by the coil is coupled to the movable conductor collar, such that the rim of the cup faces the coil. A housing is positioned around the conductive member cup body and coupled to the coil housing, forming a vacuum chamber around the separable contacts. Forming the conductive member as a cup enables various additional improvements to be made that reduce the mass of the cup, thus reducing the mass of the entire movable conductor assembly and increasing the speed at which the initial gap between the separable contacts can be achieved. One such additional improvement is producing the cup as a bi-layer structure such that the section of the cup directly facing the coil, i.e. the portion of the cup body that includes the rim, is produced from a conductive material, while the remaining portion of the cup, i.e. the portion that includes the cup base, is produced from a more lightweight and more durable material. Another such additional improvement is forming the cup body with cutouts such that the cutout portions of the cup body are thinner than other portions of the cup body.

In accordance with one aspect of the disclosed concept, an actuator assembly for use with a circuit interrupter comprises: a stationary conductor assembly, a movable conductor assembly, a housing assembly, and a coil arrangement. The stationary conductor assembly includes: a stationary conductor comprising a proximal end and a distal end disposed opposite the proximal end; a stationary separable contact coupled to the proximal end of the stationary conductor; and an insulator plate comprising a central opening through which the stationary conductor is disposed, the insulator plate being coupled to the stationary conductor and positioned distally relative to the stationary separable contact. The movable conductor assembly includes: a movable conductor comprising a proximal end and a distal end disposed opposite the proximal end; a movable separable contact coupled to the proximal end of the movable conductor; and a conductive member formed as a cup comprising a cup base and a cup body extending from the base, the cup base comprising a central opening through which the movable conductor is disposed, the conductive member being coupled to the movable conductor such that its cup base is positioned distally relative to the moveable separable contact. The housing assembly includes: a housing body formed as an open cylinder, the housing body comprising a first end and a second end disposed opposite the first the end, the housing being coupled at the first end to the insulator plate, the second end being disposed closer to the distal end of the movable conductor assembly than the first end is. The coil arrangement includes: a coil housing coupled to the first end of the housing body, and a conductive coil seated within the housing and positioned in sufficient proximity to the cup-shaped conductive member to be able to repel the cup-shaped conductive member when a current is supplied to the conductive coil. The movable conductor assembly is positioned such that the movable separable contact is aligned with the stationary separable contact. The cup body of the conductive member extends from the cup base toward the movable separable contact and surrounds the movable separable contact and the stationary separable contact. The movable conductor is structured to move between a closed position wherein the movable separable contact is in contact with the stationary separable contact and an open position wherein there is a gap between the movable separable contact and the stationary separable contact.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
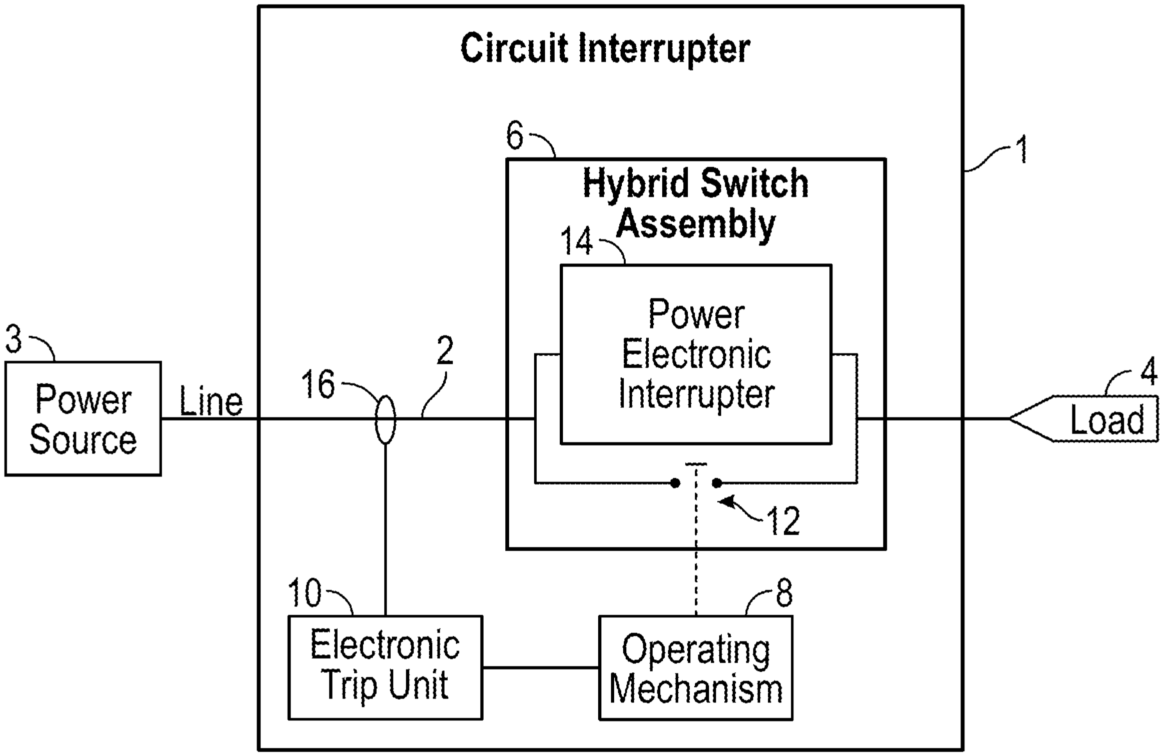
FIG. 1 is a schematic diagram of hybrid circuit interrupter, in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As employed herein, the term "processing unit" or "processor" shall mean a programmable analog and/or digital device that can store, retrieve, and process data; a microprocessor; a microcontroller; a microcomputer; a central processing unit; or any suitable processing device or apparatus.

FIG. 1 is a schematic diagram of a hybrid circuit interrupter 1 (e.g., without limitation, a circuit breaker), in accordance with an example embodiment of the disclosed concept. The circuit interrupter 1 includes a line conductor 2 structured to electrically connect a power source 3 to a load 4. The circuit interrupter 1 is structured to trip open to interrupt current flowing between the power source 3 and load 4 in the event of a fault condition (e.g., without limitation, an overcurrent condition) in order to protect the load 4, circuitry associated with the load 4, as well as the power source 3.

The circuit interrupter 1 further includes a hybrid switch assembly 6, an operating mechanism 8, and an electronic trip unit 10. The hybrid switch assembly 6 in FIG. 1 is a simplified depiction of a hybrid switch intended to demonstrate how current commutates past mechanical separable contacts 12 in a hybrid switch, and is not intended to be limiting on the different types of hybrid switch assemblies that can be included in a hybrid circuit interrupter 1. The hybrid switch assembly 6 comprises a set of mechanical separable contacts 12 and a power electronic interrupter 14. The electronic trip unit 10 is structured to monitor power flowing through the circuit interrupter 1 via a current sensor 16 and/or other sensors and to detect fault conditions based on the power flowing through the circuit interrupter 1.

Under normal operating conditions, the mechanical contacts 12 are in a closed state such that they are in contact with one another, enabling current to flow from the power source 3 through the line conductor 2 and the mechanical contacts 12 to the load 4. In addition, the power electronic interrupter 14 is powered off under normal operating conditions, such that current cannot flow through the power electronic interrupter 14. In response to detecting a fault condition, the electronic trip unit 10 is configured to output a first signal to the power electronic interrupter 14, in order to power on the power electronic interrupter 14, and to output a second signal to the operating mechanism 8, to initiate actuation of the operating mechanism 8 in order to open the mechanical contacts 12. Powering on the power electronic interrupter 14 with the first signal enables the power electronic interrupter 14 to commutate fault current from the mechanical contacts 12 to the power electronic interrupter 14. The transmission of the second signal from the trip unit 10 to the operating mechanism 8 to open the mechanical contacts 12 forces the current to pass through the power electronic interrupter 14, as current will not flow through the power electronic interrupter 14 until the mechanical contacts 12 start to separate. The faster the mechanical contacts 12 separate, the lower the fault current flow through the power electronic interrupter 14 will be.

Figure 2A:
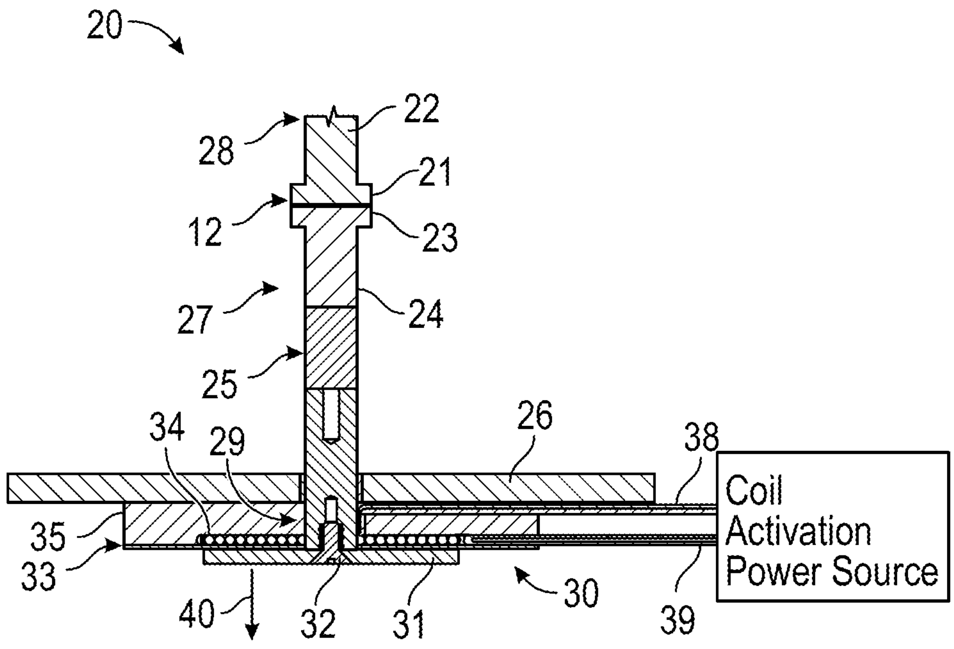
FIG. 2A (Prior Art)
FIG. 2A is a sectional view of a portion of a prior art pole assembly, including mechanical separable contacts and a prior art Thomson coil actuator that can be used as the mechanical separable contacts and operating mechanism schematically depicted in FIG. 1, with the mechanical separable contacts in a closed state.
Figure 2B:
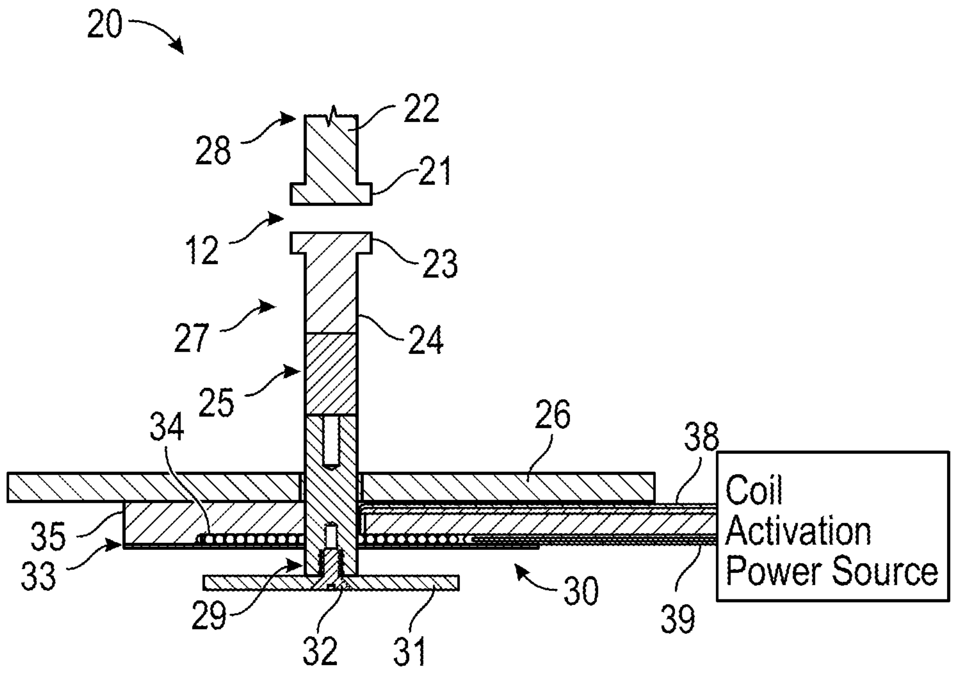
FIG. 2B (Prior Art)
FIG. 2B shows the prior art pole assembly and prior art Thomson coil actuator shown in FIG. 2A after the mechanical separable contacts have separated to an open state as a result of an opening stroke.

Thomson coil actuators are often used as part of the operating mechanism 8 to open the mechanical contacts 12. Referring now to FIGS. 2A and 2B, a portion of a pole assembly 20 that includes a prior art Thomson coil actuator for use in a circuit interrupter is shown. The pole assembly 20 can, for example and without limitation, be used in a circuit interrupter such as the hybrid circuit interrupter 1 shown in FIG. 1. The pole assembly 20 includes mechanical separable contacts and a prior art Thomson coil assembly corresponding to the mechanical separable contacts 12 and part of the operating mechanism 8 depicted in FIG. 1. It is noted that, although FIGS. 2A and 2B do not depict a vacuum chamber, the separable contacts in a hybrid circuit interrupter are often enclosed in a vacuum housing that creates a vacuum chamber to facilitate quicker extinguishment of an arc during an opening stroke.

FIG. 2A depicts the mechanical contacts 12 in a closed state, and FIG. 2B depicts the mechanical contacts 12 in an open state after an opening stroke has occurred, for example due to the trip unit 10 detecting a fault condition and thus actuating the operating mechanism 8 to open the mechanical contacts 12. The mechanical contacts 12 comprise both a stationary contact 21 disposed at one end of a stationary conductor 22, and a movable contact 23 disposed at one end of a movable conductor 24. The movable conductor 24 is coupled to a drive shaft 25 disposed through an opening in a flange 26. The composite structure comprising the movable conductor 24 and the drive shaft 25 can be referred to as the movable conductor assembly 27.

The end of the stationary conductor 22 comprising the stationary contact 21 is referred to as the proximal end of the stationary conductor 22 in order to differentiate it from the end of the stationary conductor 22 disposed opposite the stationary contact 21, which is referred to as the distal end 28 of the stationary conductor 22. Similarly, the end of the movable conductor assembly 27 comprising the movable contact 23 is referred to as the proximal end of the movable conductor assembly 27 in order to differentiate it from the end of the movable conductor assembly 27 disposed opposite the movable contact 23, which is referred to as the distal end 29 of the movable conductor assembly 27. The movable conductor assembly 27 is operably coupled to a Thomson coil actuator 30, which forms part of the operating mechanism 8 shown in FIG. 1. The Thomson coil actuator 30 comprises a conductive plate 31 coupled to the distal end 29 of the movable conductor assembly 27 via a fastener 32, and a coil arrangement 33.

The coil arrangement 33 comprises a conductive coil 34 seated within a coil housing 35. The coil arrangement 33 is structured to remain fixed in place, and stationary positioning of the coil arrangement 33 can be achieved, for example and without limitation, by fixedly coupling the coil housing 35 to a structural support element such as the flange 26. The coil 34 comprises a central opening and the coil housing 35 comprises a central opening, with the coil 34 and housing 35 structured such that their central openings align when the coil 34 is seated within the housing 35. The central openings are structured to receive the drive shaft 25 and enable the movable conductor assembly 27 to move freely in the direction indicated by arrow 40 (FIG. 2A) during an opening stroke.

The coil 34 comprises a first lead 38 and a second lead 39 that are used to electrically connect the coil 34 to a coil activation power source, such as a capacitor bank. It should be noted that the coil activation power source is distinct from the power source 3 depicted in FIG. 1. When the mechanical contacts 12 are closed and a fault condition is detected, the signal transmitted by the trip unit 10 to the operating mechanism 8 causes the power source to supply a time-varying current (e.g. a high current pulse) to the coil 34 via the leads 38, 39 generating a magnetic field. The magnetic field repels the conductive plate 31 away from the coil 34, thus driving the movable conductor assembly 27 (including the movable contact 23) away from the stationary contact 21 as indicated by the arrow 40 (FIG. 2A).

Figure 3:
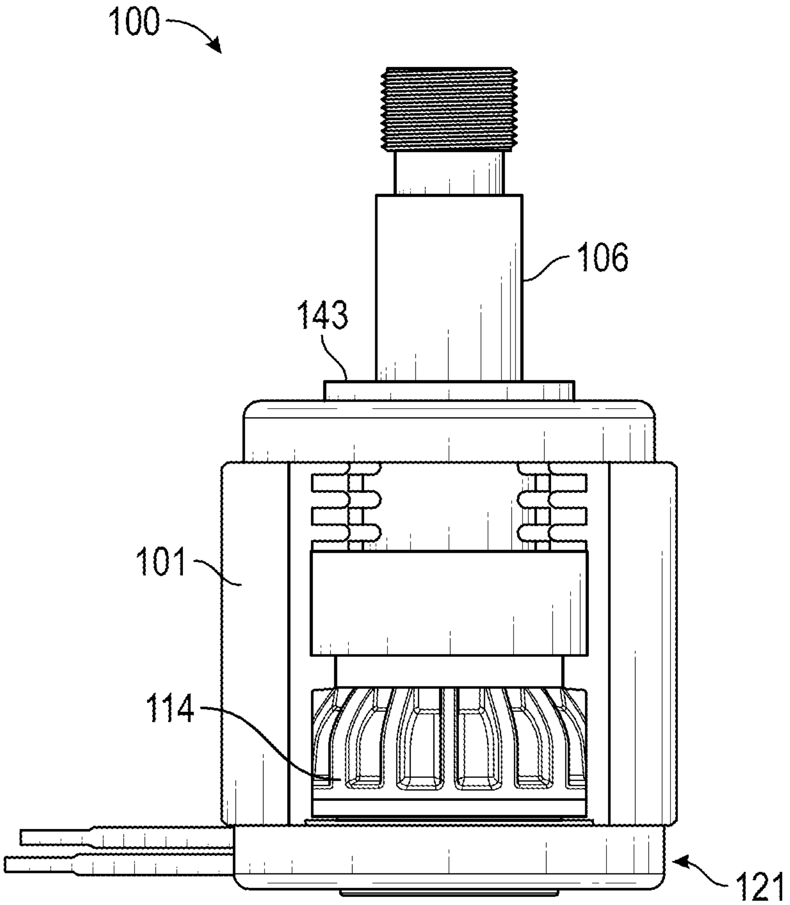
FIG. 3 is an external view of an improved Thomson coil actuator assembly that is integrated into both a stationary conductor assembly and a movable conductor assembly, intended for use with a circuit interrupter such as the hybrid circuit interrupter shown in FIG. 1, in accordance with an example embodiment of the disclosed concept.

Referring now to FIGS. 3-7, an improved Thomson coil actuator assembly 100 according to exemplary embodiments of the disclosed concept is shown. The improved Thomson coil actuator assembly 100 can, for example and without limitation, be used in a pole assembly for a circuit interrupter such as the hybrid circuit interrupter 1 shown in FIG. 1. FIG. 3 shows the exterior of the improved Thomson coil actuator assembly 100, with a portion of its housing body 101 cut away, in order to show various components contained within the housing body 101. The components numbered in FIG. 3 are detailed further in conjunction with FIGS. 4A-7 hereinafter. FIGS. 4A and 4B are sectional views of the improved Thomson coil actuator assembly 100 that show the components housed within the housing body 101. FIG. 4A shows the actuator assembly 100 in a closed state, and FIG. 4B shows the actuator assembly 100 in an open state after an opening stroke, with an approximately 2 mm gap between the separable contacts.

Figure 4A:
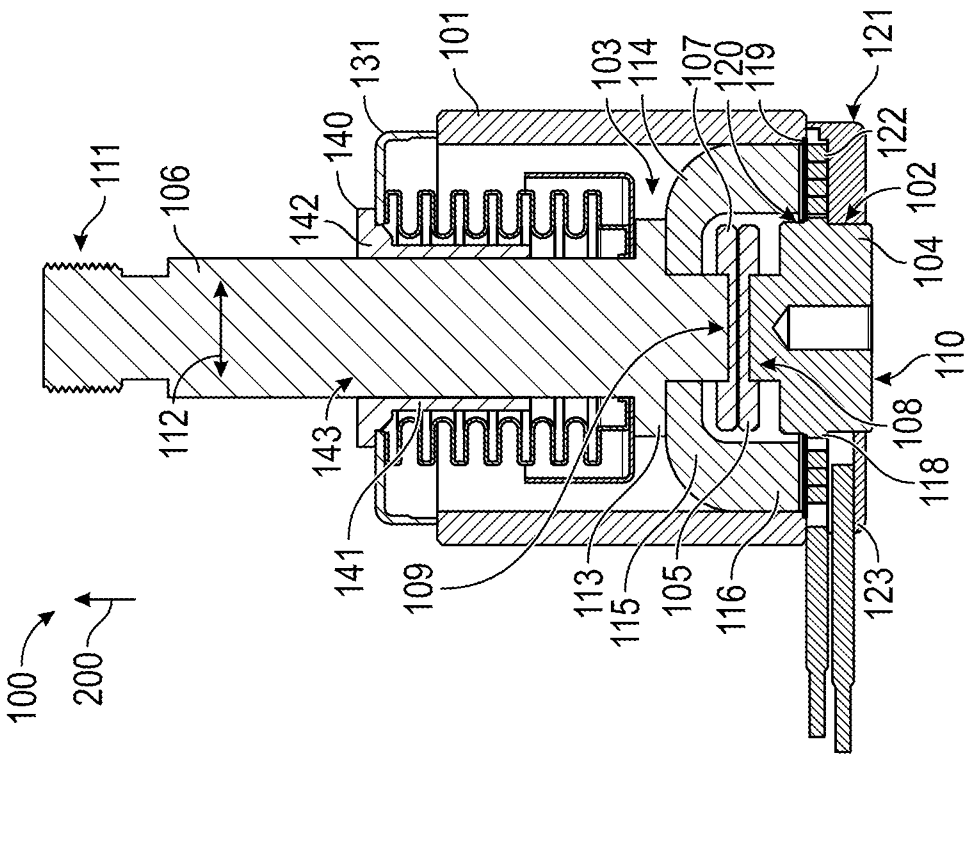
FIG. 4A is a sectional view of the improved Thomson coil actuator assembly shown in FIG. 3, showing the mechanical separable contacts of the actuator assembly in a closed state, in accordance with an example embodiment of the disclosed concept.
Figure 4B:
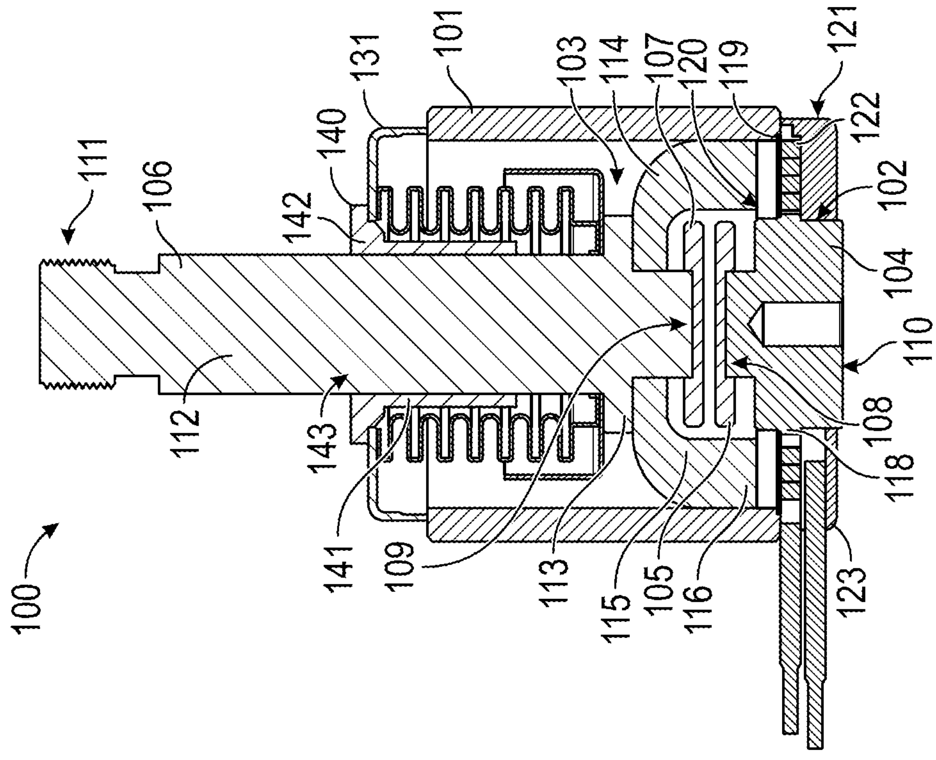
FIG. 4B shows the sectional view of the improved Thomson coil actuator assembly shown FIG. 4A after the mechanical separable contacts have separated to an open state as a result of an opening stroke, in accordance with an example embodiment of the disclosed concept.

Continuing to refer to FIGS. 4A and 4B, the Thomson coil actuator assembly 100 comprises a stationary conductor assembly 102 and a movable conductor assembly 103, with the stationary conductor assembly 102 comprising a stationary conductor 104 that includes a stationary separable contact 105, and with the movable conductor assembly 103 comprising a movable conductor 106 that includes a movable separable contact 107. The end of the stationary conductor 104 comprising the stationary contact 105 is the proximal end 108 of the stationary conductor 104 (as well as the proximal end 108 of the stationary conductor assembly 102), and the end of the movable conductor 106 comprising the movable contact 107 is the proximal end 109 of the movable conductor 106 (as well as the proximal end 109 of the movable conductor assembly 103). The end of the stationary conductor 104 disposed opposite the stationary contact 105 and proximal end 108 is the distal end 110 of the stationary conductor 104 (as well as the distal end 110 of the stationary conductor assembly 102). Similarly, the end of the movable conductor 106 disposed opposite the movable contact 107 and proximal end 109 is the distal end 111 of the movable conductor 106 (as well as the distal end 111 of the movable conductor assembly 103).

Hereinafter, as used in relation to the stationary conductor assembly 102, the term "proximal" may additionally be used to denote a side of a component that is closer to the stationary separable contact 105 than to the distal end 110. As used in relation to the movable conductor assembly 103, the term "proximal" may additionally be used to denote a side of a component that is closer to the movable separable contact 107 than to the distal end 111. In addition, the term "proximal" may be used to describe a direction moving away from the distal end 110 of the stationary conductor assembly 102 toward the stationary separable contact 105, or to describe a direction moving away from the distal end 111 of the movable conductor assembly 103 toward the movable separable contact 107.

Similarly, as used in relation to the stationary conductor assembly 102, the term "distal" may additionally be used to denote a side of a component that is closer to the distal end 110 than to the stationary separable contact 105. As used in relation to the movable conductor assembly 103, the term "distal" may additionally be used to denote a side of a component that is closer to the distal end 111 than to the movable separable contact 107. In addition, the term "distal" may be used to describe a direction moving away from the proximal end 108 of the stationary conductor assembly 102 toward the distal end 110, or to describe a direction moving away from the proximal end 109 of the movable conductor assembly 103 toward the distal end 111. Furthermore, the terms "lateral" and "laterally" may be used to describe a direction or orientation that is perpendicular to the proximal and distal directions/orientations, i.e. leftward and rightward relative to the views shown in FIGS. 4A, 4B, and 5.

The improved Thomson coil actuator assembly 100 can be differentiated from prior art Thomson coil actuators such as the prior art actuator 30 shown in FIGS. 2A-2B in several ways. First, while all of the components of the Thomson coil actuator 30 are coupled to and/or positioned in relation to only the movable conductor assembly 27 in order to act upon the distal end 29 of the movable conductor assembly 27, the improved Thomson coil actuator assembly 100 comprises both components that are coupled to and/or positioned in relation to the movable conductor assembly 103 and components that are coupled to and positioned in relation to the stationary conductor assembly 102, as detailed further later herein. Next, the prior art Thomson coil actuator 30 only exerts force upon the distal end 29 of the movable conductor assembly 27 during an opening stroke, while in the improved Thomson coil actuator assembly 100, force is exerted upon the proximal end 109 of the movable conductor assembly 103 during an opening stroke.

In addition, none of the components of the prior art actuator 30 are integrally joined with the movable conductor assembly 27 (the fastener 32 used to couple the conductive member 31 to the drive shaft 25 is structured to enable the conductive member to be removed from and re-coupled to the drive shaft 25 at will), while the components of the improved Thomson coil actuator assembly 100 are integrally joined with the stationary conductor assembly 102 and the movable conductor assembly 103, as detailed further herein. Integrating the components of the improved Thomson coil actuator assembly 100 with the proximal ends of the stationary conductor assembly 102 and movable conductor assembly 103 results in the improved actuator assembly 100 using up to 2 inches less vertical space in a pole assembly for a typical hybrid circuit interrupter 1, and further results in the improved actuator assembly 100 having a smaller footprint than the prior art composite structure formed by the stationary conductor 22, movable conductor assembly 27, and Thomson coil actuator 30.

Continuing to refer to FIGS. 4A-4B, it is noted that a majority of the structure of the movable conductor 106 is a stem portion having a width 112 that is disposed between the proximal end 109 and the distal end 111. The movable conductor 106 is formed with a collar 113 that is positioned between the stem portion and the proximal end 109, with the collar 113 being wider than both the stem width 112 and the width of the proximal end 109. Alternatively, the collar 113 can be thought of as extending laterally outward from the movable conductor stem portion. The movable conductor assembly 103 further comprises a conductive member 114 that is formed as a cup, with the base 115 of the cup being integrally joined to the proximal side of the collar 113 (via brazing, for example and without limitation) and disposed between the proximal side of the collar 113 and the movable contact 107, such that the cup body 116 extends proximally from the cup base 115 past the movable contact 107 and surrounds both the movable contact 107 and the stationary contact 105. In addition, it is noted that the cup base 115 comprises a central opening 117 that is structured to receive the proximal end 109 of the movable conductor 106.

Figure 5:
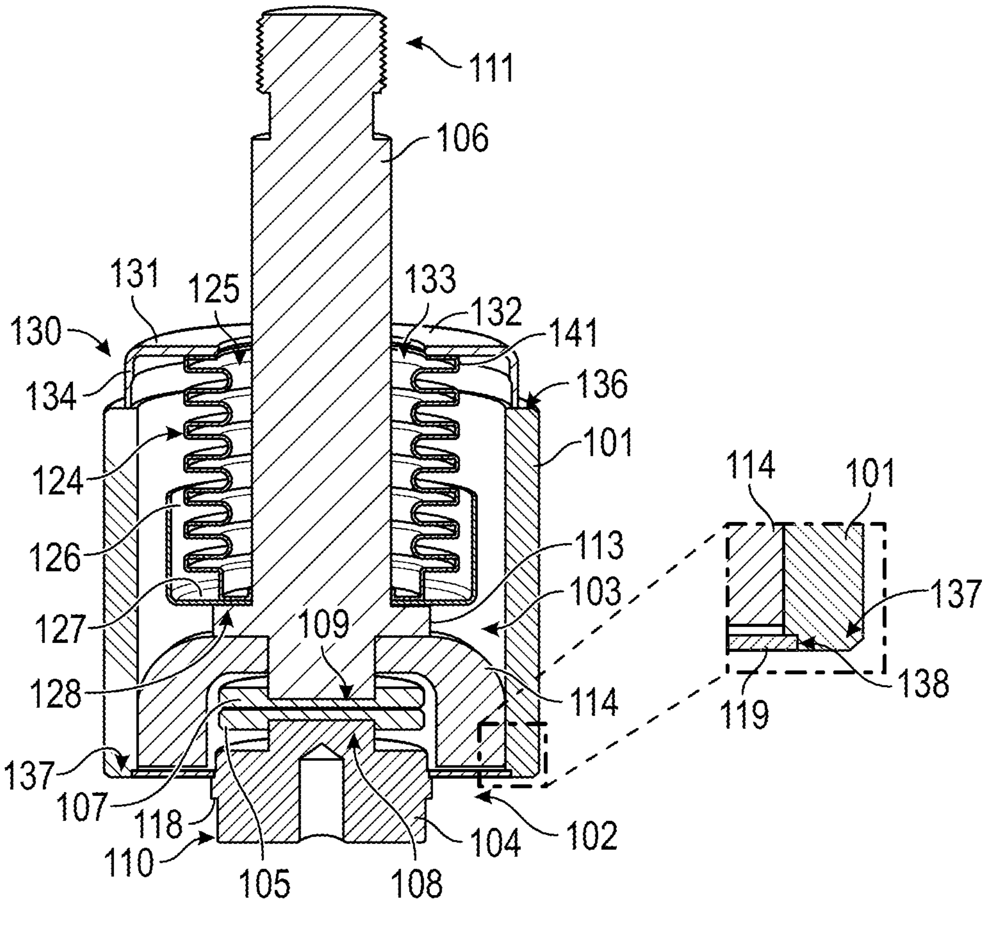
FIG. 5 shows a sectional view of a portion of the improved Thomson coil actuator assembly shown FIGS. 4A and 4B, prior to the addition of the coil arrangement shown FIGS. 4A and 4B, in accordance with an example embodiment of the disclosed concept.

Continuing to refer to FIGS. 4A and 4B, the stationary conductor 104 is also formed with a collar 118, as well as a ceramic insulator plate 119, both of which may be easier to discern in FIG. 5. The collar 118 is positioned between the distal end 110 and the proximal end 108, and the portion of the stationary conductor 104 disposed between the distal end 110 and the collar 118 can be referred to as the stem portion of the stationary conductor 104. As shown in the figures, the collar 118 is wider than both the stem and the proximal end 108 of the stationary conductor 104. Alternatively, the collar 118 can be thought of as extending laterally outward from the stationary conductor stem portion. The ceramic insulator plate 119 is integrally joined with the stationary conductor 104 on the proximal side of the collar 118, via brazing, for example and without limitation. The insulator plate 119 is substantially circular in shape when viewed in a plane orthogonal to the view plane of FIGS. 4A and 4B, and comprises an opening 120 structured to receive the proximal end 108 of the stationary conductor 104. In an exemplary embodiment, the insulator plate 119 is 1.5 millimeters to 2 millimeters thick.

Figure 6:
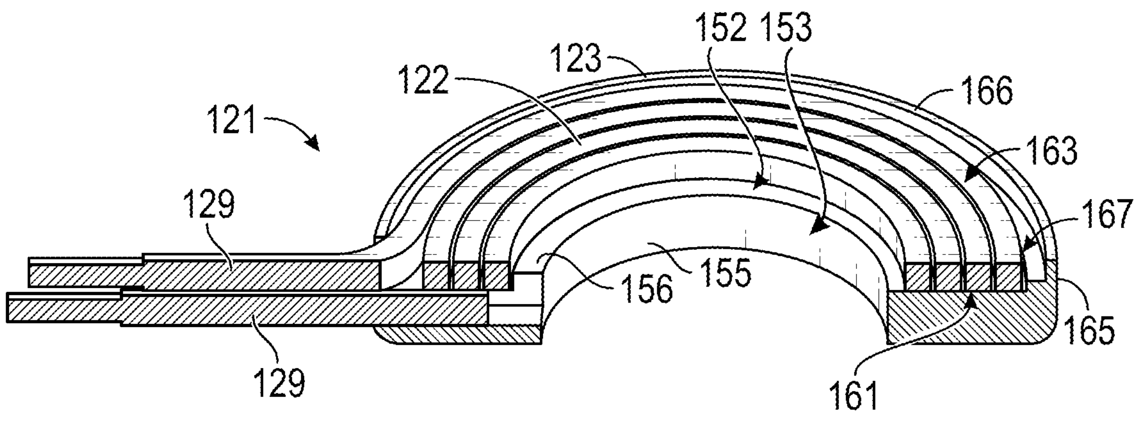
FIG. 6 shows a partial isometric sectional view of the coil arrangement of the improved Thomson coil actuator assembly shown FIGS. 4A and 4B, in accordance with an example embodiment of the disclosed concept.
Figure 7:
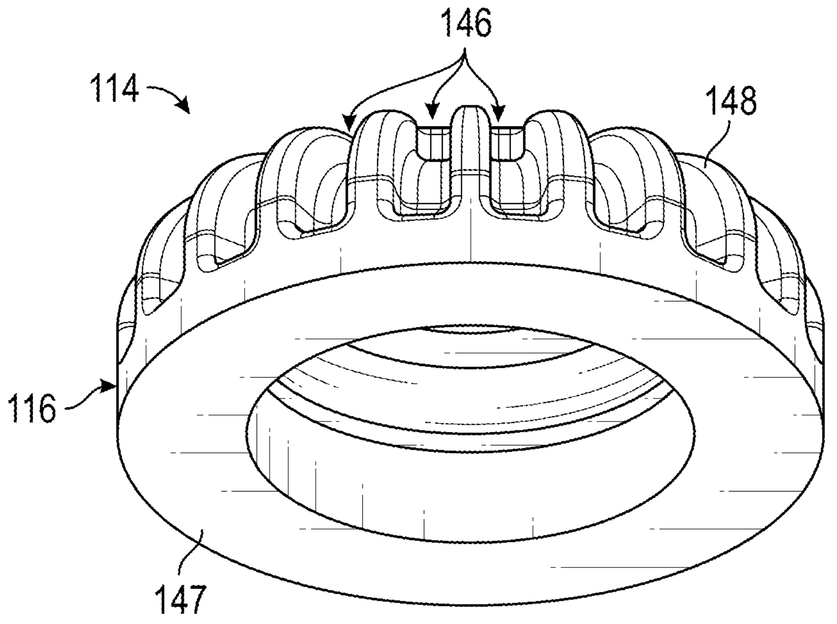
FIG. 7 is a sectional view of a conductive member of the improved Thomson coil assembly shown in FIGS. 4A, 4B, and 5, showing additional advantageous features that can be included in the conductive member, in accordance with an example embodiment of the disclosed concept.

Referring now to FIGS. 5, 6, and 7 in addition to FIGS. 4A-4B, further details about the stages of production of the improved actuator assembly 100 will now be provided. FIG. 5 shows a sectional view of the improved actuator assembly 100 prior to its final assembly, and more specifically, prior to a coil arrangement 121 (the coil arrangement 121 being shown in isolation in FIG. 6) being coupled to the stationary conductor assembly 102 and movable conductor assembly 103. As a general overview of the production process: the stationary conductor assembly 102 and the movable conductor assembly 103 are each produced separately; then each of the conductor assemblies 102 and 103 are coupled to a housing assembly comprising the housing body 101, which indirectly couples the conductor assemblies 102 and 103 to one another; and finally, the coil arrangement 121 is coupled to the housing assembly, thus completing the actuator assembly 100.

Referring now to FIG. 5, the stationary conductor assembly 102 and the movable conductor assembly 103 are produced separately in the first stage of production. To produce the stationary conductor assembly 102, the proximal end 108 of the stationary conductor 104 is inserted into the opening 120 of the ceramic insulator plate 119 until the ceramic insulator plate 119 and the stationary conductor collar 118 are adjacent to and in contact with one another. The ceramic insulator plate 119 is then brazed to the stationary conductor 104, and the stationary contact 105 is brazed to the proximal end 108 of the stationary conductor 104. To produce the movable conductor assembly 103, the proximal end 109 of the movable conductor 106 is inserted into the opening 117 of the conductive member cup base 115 until the cup base 115 and the movable conductor collar 113 are adjacent to and in contact with one another. The conductive member 114 is then brazed to the movable conductor 106, and the movable contact 107 is brazed to the proximal end 109 of the movable conductor 106.

Still referring to FIG. 5, in the second stage of production, a vacuum chamber is constructed to enclose the separable contacts 105, 107 in order to provide improved arc extinguishing capability. The construction of the vacuum chamber also results in the indirect coupling of the movable conductor assembly 103 to the stationary conductor assembly 102. First, a set of bellows 124 with a central opening 125 is positioned within a bellow anchoring cup 126. The bellow anchoring cup 126 provides structural support for the bellows 124 and protects the bellows 124 from cathode arc tracks while the circuit interrupter 1 is in operation. The bellow anchoring cup also provides internal stability electrically by guiding electrical fields away from the junction formed where the conductive cup 114 meets the ceramic insulator plate 119 in the vacuum chamber when the separable contacts 105, 107 are closed. The bellow anchoring cup 126 comprises a cup base 127 with a central opening 128. The bellows 124 are structured to be positioned within the bellow anchoring cup 126 so that the bellows central opening 125 aligns with the anchoring cup central opening 128, and such that one end of the bellows 124 can be coupled to the anchoring cup base 127, via brazing for example and without limitation. The distal end 111 of the movable conductor 106 is inserted into the aligned central openings 125, 128 of the anchoring cup 126 and bellows 124 until the anchoring cup base 127 and the distal side of the movable conductor collar 113 are adjacent to and in contact with one another. The cup base 127 is then coupled to the movable conductor collar 113 via brazing, for example and without limitation.

Continuing to refer to FIG. 5, next, a housing assembly 130 is coupled to the movable conductor assembly 103, with the housing assembly 130 comprising the housing body 101, a bellows shielding cup 131, and a housing collar piece 140 (shown and numbered only in FIGS. 4A and 4B, and detailed further later herein). In an exemplary embodiment, the housing body 101 is ceramic. The bellows shielding cup 131 is produced separately from the housing body 101 and is fixedly coupled to the housing body 101. The housing body 101 is an open cylinder, such that it has the shape of a cylinder that lacks two circular end surfaces. The bellows shielding cup 131 comprises a base 132 with a central opening 133, and a body 134 that extends from the base 132. It will be appreciated that brazing the distal-most convolution to the base 132 of the bellows shielding cup 131 seals the interior of the housing assembly 130, enabling the housing assembly 130 to be suitable for use as a vacuum chamber.

Still referring to FIG. 5, the housing body 101 comprises a first end 136 and a second end 137 disposed opposite the first end 136, with the first end 136 being structured to be coupled to the bellows shielding cup 131, and with the second end 137 being structured to be coupled to the ceramic insulator plate 119 of the stationary conductor assembly 102, as shown in the enlarged inset in FIG. 5. The first end 136 of the housing body 101 can additionally be defined as the end of the housing body 101 that is disposed closer to the distal end 111 of the movable conductor assembly 103 than the second end 137 is in the completed actuator assembly 100. It is noted that the designation of end 136 as the "first" end of the housing body 101 and the designation of end 137 as the "second" end is done solely to differentiate the two ends from one another, and that end 136 can alternatively be referred to as the second and end 137 can alternatively be referred to as the first end.

As shown in FIG. 5, the first end 136 of the housing body 101 is thick enough to support a distal end of the bellows shielding cup body 134, and the bellows shielding cup 131 can be brazed to the first end 136 of the housing body 101 after placing the distal end of the cup body 134 on the first end 136 of the housing body 101. In viewing the enlargement inset shown in FIG. 5, it can be seen that the second end 137 of the housing body 101 is formed with an insulator plate receiving notch 138 structured to receive a step formed by the ceramic insulator plate 119. More specifically, the ceramic insulator plate 119 extends laterally beyond the exterior surface of the conductive member cup body 116, such that a step is formed by the portion of the ceramic insulator plate 119 that is disposed outward of the exterior surface of the cup body 116, and the insulator plate receiving notch 138 of the housing body 101 is structured to rest upon the step formed by the ceramic insulator plate 119, as shown in the FIG. 5 enlargement inset.

It is noted that the components of the stationary conductor assembly 102, the movable conductor assembly 103, the coil arrangement 121 (detailed later herein in conjunction with FIG. 6), and the housing assembly 130 all have a circular cross section when viewed in a plane orthogonal to the viewing plane of FIGS. 4A, 4B, and 5 and containing the arrow 112 shown in FIG. 4A. Accordingly, reference may be made hereinafter to circular dimensions or attributes of a component, and it should be understood that these circular dimensions/attributes are disposed in said orthogonal plane. In one non-limiting example, the housing body 101 can be stated to comprise an inner circumference and an outer circumference, with the inner circumference being that disposed adjacent to the conductive member 114, and the outer circumference being that which is exposed to the exterior of the housing body 101.

Prior to coupling the housing assembly 130 to the conductor assemblies 102 and 103, the movable conductor assembly 103 is positioned so that the movable contact 107 is aligned with and in contact with the stationary contact 105. In order to couple the housing assembly 130 to the conductor assemblies, the distal end 111 of the movable conductor assembly 103 is inserted through the second end 137 of the housing body 101 until the housing insulator plate receiving notch 138 and the insulator plate 119 are adjacent to and in contact with one another, and then the insulator plate receiving notch 138 and the insulator plate 119 are brazed together.

The housing body 101 and the cup body 116 of the conductive member 114 are each structured to enable the outer circumference of the cup body 116 to fill the inner circumference of the housing body 101 while maintaining a minimal gap between the cup body 116 and the housing body 101 in order to enable the movable conductor assembly 103 to move freely during an opening stroke (i.e. in the direction indicated by arrow 200 in FIG. 4A). As shown in FIGS. 4A and 5, the components of the movable conductor assembly 103 are proportioned to ensure that, when the separable contacts 105 and 107 are new, there will be a slight gap between the rim of the cup body 116 and the insulator plate 119 when the separable contacts 105 and 107 are closed. The gap between the rim of the cup body 116 and the insulator plate 119 increases when the separable contacts 105 and 107 open, as can be seen by comparing FIG. 4B to FIG. 4A. In an exemplary embodiment, the movable conductor assembly 103 is proportioned so that the gap between the rim of the cup body 116 and the insulator plate 119 is 0.030 inches when the separable contacts 105 and 107 are new and in the closed position. The separable contacts 105 and 107 are enclosed by the structure formed by the conductive member 114, the insulator plate 119, and the housing body 101, with the housing body 101 forming part of the enclosure due to the gap between the rim of the cup body 116 and the insulator plate 119.

Proportioning the components of the movable conductor assembly 103 so that there is a slight gap between the rim of the cup body 116 and the insulator plate 119 in the closed state when the separable contacts 105 and 107 are new allows the separable contacts 105 and 107 to erode (e.g. due to arcing) up to a certain point and ensure that the separable contacts 105 and 107 will still touch when the movable conductor assembly 103 is in the closed state. As the separable contacts 105 and 107 erode over time, the size of the gap that exists between the rim of the cup body 116 and the insulator plate 119 when the separable contacts 105 and 107 are closed decreases, since the decrease in the mass of the contacts 105 and 107 causes the proximal end 109 of the movable conductor 106 to be positioned closer to the proximal end 108 of the stationary conductor 104 (relative to the view shown in FIGS. 4A and 5, the position of the proximal end 109 of the movable conductor 106 will move further downward over time as the contacts 105 and 107 erode). Provided that the combined total erosion of the separable contacts 105 and 107 does not exceed the length of the initial gap that existed between the rim of the cup body 116 and the insulator plate 119 when the separable contacts 105 and 107 were new, the separable contacts 105 and 107 will still touch one another when the movable conductor assembly 103 is in the closed state. For example, if the gap between the rim of the cup body 116 and the insulator plate 119 was 0.030 inches when the separable contacts 105 and 107 were new and in the closed state, the separable contacts 105 and 107 can erode and will still touch one another when the movable conductor assembly 103 is in the closed state, provided that the combined total erosion of the separable contacts 105 and 107 is 0.030 inches or less.

It will be appreciated that brazing the insulator plate receiving notch 138 and the insulator plate 119 together effectively secures the movable conductor assembly 103 to remain contained within the housing assembly 130, as the bellows central opening 125 is designed to be narrower than the width of the distal-most convolution of the bellows 124. Referring again to FIGS. 4A and 4B, as previously noted, the housing assembly 130 further comprises a housing collar piece 140. The housing collar piece 140 is used to help substantially seal the chamber formed by the exterior housing body 101 and the bellows shielding cup 131, by filling the gap between the central opening 133 of the bellows shielding cup 131 and the central portion of the movable conductor 106 (said gap being visible in FIG. 5). The housing collar piece 140 also helps to prevent the movable conductor 106 from moving laterally (i.e. toward the left or the right, relative to the views shown in FIGS. 4A, 4B, and 5).

The housing collar piece 140 comprises a body 141 and a collar 142 extending laterally from the body 141 at the distal end of the body 141. The body 141 comprises a central opening 143 such that the distal end 111 of the movable conductor 106 can be inserted within the collar piece central opening 143 until the collar 142 is adjacent to and in contact with the distal side of the bellows shielding cup 131. The collar 142 can then be coupled to the bellows shielding cup 131 using anaerobic adhesives, or any other bonding method appropriate for fixedly coupling the collar 142 to the bellows shielding cup 131. It is noted that the collar body 141 is structured to fit closely around the stem of the movable conductor 106 in order to substantially seal the chamber created by the housing assembly 130 while still allowing the movable conductor 106 to move freely during an opening stroke, i.e. in the direction indicated by arrow 200 (FIG. 4A).

Referring now to FIG. 6, the coil arrangement 121 is assembled next. FIG. 6 shows a partial isometric sectional view of the coil arrangement 121, which comprises a conductive coil 122 seated within a coil housing 123. It is noted that the coil housing 123 is not a closed structure on its own, but rather, is structured to be coupled to the insulator plate 119 (as detailed later herein) in order to form a complete housing that encloses the coil 122, aside from the two leads 129 that are used to electrically connect the coil 122 to a coil activation power source (not shown in the figures), such as a capacitor bank. The coil 122 comprises a central opening 152, and the coil housing 123 comprises a central opening 153 defined by an inner wall 155. The coil 122 is structured such that its central opening 152 has a greater circumference than the coil housing central opening 153. The coil 122 and coil housing 123 are further structured such that, when the coil 122 is seated within the coil housing 123, the coil central opening 152 surrounds a central portion of the coil housing 123 (i.e. a portion of the coil housing 123 adjacent to the housing central opening 153) that can be referred to as the collar coupling lip 156. The collar coupling lip 156 is so named because it is structured to be joined to the distal side of the stationary conductor collar 118, as detailed later herein.

The coil 122 comprises a distal surface 161 and a proximal surface 163, with the distal surface 161 being the surface of the coil 122 that rests upon the coil housing 123 and the proximal surface 163 being the surface of the coil 122 disposed opposite the coil distal surface 161. In an exemplary embodiment, the coil proximal surface 163 is coated with a thin layer of epoxy to provide an even and smooth surface to support the ceramic insulator plate 119 and provide good insulation between the coil 122 and the conductive member 114 when the coil arrangement 121 is subsequently coupled to the housing assembly 130 in order to complete the actuator assembly 100.

In addition, the coil housing 123 comprises an outer wall 165 that forms a lip 166 such that the lip 166 surrounds the outer circumference 167 of the coil. This lip 166 can be referred to as the housing body coupling lip 166, because it is structured to be joined to the second end 137 of the housing body 101, as detailed later herein. When the coil 122 is seated within the coil housing 123, the housing body coupling lip 166 is level with the coil proximal surface 163. The coil central opening 152 is structured to receive the stationary conductor collar 118 and the coil housing central opening 153 is structured to receive the stationary conductor 104 stem portion, as can be seen in FIGS. 4A and 4B.

Accordingly, the next step of production of the assembly 100 is to insert the stationary conductor distal end 110 through the central openings 152 and 153 of the coil 122 and coil housing 123 until: (1) the collar coupling lip 156 of the coil housing 123 is adjacent to and in contact with the distal side of the stationary conductor collar 118, and (2) the housing body coupling lip 166 is adjacent to and in contact with the second end 137 of the housing body 101. As a result, the inner wall 155 of the coil housing 123 mates with the stem portion of the stationary conductor 104 (as can be seen in FIG. 4A). At this point, the coil housing 123 can be coupled to the housing body 101 and to the stationary conductor collar 118 using solder material, anaerobic adhesives, or any other bonding method appropriate for coupling the metal surface of the coil housing 123 with the ceramic of the housing body 101, as the epoxy coating on the coil proximal surface 163 cannot undergo brazing. Once the coil housing 123 is coupled to the housing body 101, the stationary conductor 104 stem portion fits snugly within the coil housing central opening 153 and the stationary conductor collar 118 fits snugly within the coil central opening 152. This completes production of the improved Thomson coil actuator assembly 100.

FIG. 4B shows the improved actuator assembly 100 after the separable contacts 105 and 107 have separated to an open state during an opening stroke, and in comparing FIG. 4B to FIG. 4A, it can be seen that the movable conductor assembly 103 can move freely in the direction indicated by arrow 200 labeled in FIG. 4A.

The advantageous features of the improved Thomson coil actuator assembly 100 will now be discussed and compared to prior art Thomson coil actuators for circuit interrupters, such as the prior art Thomson coil actuator 30 shown in FIGS. 2A-2B. In the improved Thomson coil actuator assembly 100, the components that must be moved during an opening stroke are all components of the movable conductor assembly 103, and in the prior art Thomson coil actuator 30, the components that must be moved during an opening stroke are the movable conductor assembly 27, the conductive plate 31, and the fastener 32 that couples the conductive plate 31 to the movable conductor assembly 27. One advantage of the improved Thomson coil actuator assembly 100 is that the mass of the movable conductor assembly 103 is significantly less (e.g. up to 10% less) than the combined mass of the prior art movable conductor assembly 27, the conductive plate 31, and the fastener 32. The lesser mass of the movable components of the improved assembly 100 leads to a faster opening time with regard to achieving an initial short gap between the separable contacts 12. In an exemplary embodiment, the movable conductor assembly 103 is able to achieve an initial gap of 1 mm between the separable contacts 12 within 250 to 300 microseconds.

In addition, forming the conductive member 114 of the improved assembly 100 as a cup whose body 116 surrounds the proximal ends 109 and 108 of the movable and stationary conductors 106 and 104, rather than as a plate attached to the distal end 29 of the movable conductor assembly 27 (as the prior art conductive plate 31 is) reduces the amount of vertical space used up by the conductive member ("vertical" being relative to the view shown in FIGS. 4A, 4B, and 5). Although not shown in FIGS. 2A and 2B, prior art vacuum interrupters typically include a set of bellows attached to a movable conductor within the vacuum housing, with one end of the bellows welded to the movable separable contact and the other end of the bellows welded to the interior of the vacuum housing, in order to seal the vacuum chamber while also allowing the movable conductor to move freely during an opening stroke. In the improved assembly 100, the reduced mass of the movable conductor assembly 103 enables the bellows 124 to have fewer convolutions than the bellows typically used in prior art Thomson coil actuators 30, since the lighter movable conductor assembly 103 has less of an impact on the bellows 124 during an opening stroke than the prior art movable conductor assembly 27 would have. The bellows 124 having fewer convolutions further reduces the amount of vertical space used by the movable conductor assembly 103. Due to both the cup shape of the conductive member 114 and the fewer convolutions of the bellows 124, it is expected that the improved assembly 100 uses 1.5 to 2 inches less of vertical space in a pole assembly when compared to most known vacuum interrupters that use prior art Thomson coil actuators 30.

Referring now to FIG. 7, the conductive member 114 of the improved Thomson coil actuator assembly 100 can be designed with several features that further reduce the mass of the movable conductor assembly 103 and increase the speed at which the movable conductor assembly 103 can be opened. First, the conductive member 114 can be produced with a number of cutouts 146 such that, instead of the cup body 116 having a uniform thickness, the cup body 116 is thinner in those portions with the cutouts 146. It will be appreciated that the cutouts 146 result in the cup body 116 having less mass than if the cup body 116 were of a uniform thickness. In an exemplary embodiment, the cutouts 146 reduce the mass of the conductive member 114 by 50%. Second, only the portion of the cup body 116 disposed adjacent to the coil 122 needs to capable of having a magnetic field induced in order to actuate an opening stroke of the movable conductor assembly 103. Accordingly, in an exemplary embodiment of the conductive member 114, the conductive member 114 is produced as a bi-layer structure with two sections: a magnetizing section 147, and a structural reinforcement section 148. The magnetizing section 147 is produced from a relatively high conductivity material, such as copper for example and without limitation, while the structural reinforcement section 148 is formed from a material that is more durable and lightweight (i.e. having a lesser atomic mass) than the magnetizing section 144, such as titanium or tungsten for example and without limitation.

Still referring to FIG. 7, it will be appreciated that the magnetizing section 147 needs to have relatively high conductivity so that the coil 122 can induce a magnetic field in section 147 that enables the coil 122 to repel the conductive member 114 when the coil 122 is activated. However, the conductive member 114 needs to be able to withstand the high forces produced during an opening stroke, and the conductive materials that are suitable for producing a magnetic field in the magnetizing section 147 tend to have lower strength compared to other materials with higher durability and lower conductivity. Hence, the structural reinforcement section 148 is produced from material that is both more durable and more lightweight than the conductive material of the magnetizing section 147. This results in the conductive member 114 of the improved assembly 100 being more lightweight than the conductive plates 31 typically found in prior art actuators, as the prior art conductive plates 31 are typically made entirely from a higher conductivity and higher mass material.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An actuator assembly for use with a circuit interrupter, the actuator assembly comprising:

a stationary conductor assembly, the stationary conductor assembly comprising:

a stationary conductor comprising a proximal end and a distal end disposed opposite the proximal end;

a stationary separable contact coupled to the proximal end of the stationary conductor; and an insulator plate comprising a central opening through which the stationary conductor is disposed, the insulator plate being coupled to the stationary conductor and positioned distally relative to the stationary separable contact;

a movable conductor assembly, the movable conductor assembly comprising:

a movable conductor comprising a proximal end and a distal end disposed opposite the proximal end;

a movable separable contact coupled to the proximal end of the movable conductor; and a conductive member formed as a cup comprising a cup base and a cup body extending from the base, the cup base comprising a central opening through which the movable conductor is disposed, the conductive member being coupled to the movable conductor such that its cup base is positioned distally relative to the moveable separable contact;

a housing assembly, the housing assembly comprising:

a housing body formed as an open cylinder, the housing body comprising a first end and a second end disposed opposite the first the end, the housing being coupled at the first end to the insulator plate, the second end being disposed closer to the distal end of the movable conductor assembly than the first end is; and a coil arrangement, the coil arrangement comprising:

a coil housing coupled to the first end of the housing body; and a conductive coil seated within the housing and positioned in sufficient proximity to the cup-shaped conductive member to be able to repel the cup-shaped conductive member when a current is supplied to the conductive coil, wherein the movable conductor assembly is positioned such that the movable separable contact is aligned with the stationary separable contact, wherein the cup body of the conductive member extends from the cup base toward the movable separable contact and surrounds the movable separable contact and the stationary separable contact, and wherein the movable conductor is structured to move between a closed position wherein the movable separable contact is in contact with the stationary separable contact and an open position wherein there is a gap between the movable separable contact and the stationary separable contact.

2. The actuator assembly of claim 1, wherein the stationary conductor is formed as a stem with a stationary conductor collar, such that the stationary conductor collar extends laterally outward from the stem, the stationary conductor collar comprising a proximal side facing toward the stationary separable contact and a distal side disposed opposite the proximal side, and wherein the insulator plate is coupled to the proximal side of the stationary conductor collar.

3. The actuator assembly of claim 2, wherein the coil comprises a distal surface and a proximal surface disposed opposite the distal surface, the coil distal surface being structured to contact the coil housing when the coil is seated within the coil housing, wherein the coil comprises a coil central opening, wherein the coil housing comprises a coil housing central opening, wherein the coil is structured such that the coil central opening aligns with the coil housing central opening when the coil is seated within the coil housing, wherein the coil housing is structured such that, when the coil is seated within the coil housing, a collar coupling lip is formed, the collar coupling lip being a portion of the coil housing that is adjacent to the coil housing central opening and that is surrounded by the coil central opening when the coil is seated within the coil housing, and wherein the coil housing is structured such that, when the coil housing is coupled to the housing body, the collar coupling lip contacts the distal side of the stationary conductor collar and the proximal side of the coil contacts the insulator plate.

4. The actuator assembly of claim 3, wherein the coil housing is further structured such that, when the coil is seated within the coil housing, a housing body coupling lip is formed, the housing body coupling lip being a portion of the coil housing that surrounds the outer circumference of the coil and that is level with the proximal surface of the coil, and wherein the coil housing is structured such that, when the coil housing is coupled to the housing body, the housing body mating lip contacts the first end of the housing body.

5. The actuator assembly of claim 1, wherein the movable conductor is formed with a movable conductor collar, the movable conductor collar comprising a proximal side facing toward the movable separable contact and a distal side disposed opposite the proximal side, wherein the conductive member cup base is coupled to the proximal side of the movable conductor collar, and wherein the movable conductive collar is positioned and the conductive member is proportioned such that, when the movable conductor is in the closed position, a rim of the conductive member cup body is in contact with the insulator plate.

6. The actuator assembly of claim 5, wherein the housing assembly further comprises:

a bellows shielding cup comprising a shielding cup base and a shielding cup body extending from the shielding cup base, the shielding cup base comprising a central opening through which the movable conductor is disposed, with a rim of the shielding cup body being coupled to the second end of the housing body such that the shielding cup base is disposed distally relative to the housing body; and a set of bellows coupled at a first end to a distal side of the movable conductor collar and coupled at a second end to a proximal side of the shielding cup base, the bellows comprising a central opening through which the movable conductor is disposed, wherein the housing assembly forms a vacuum chamber.

7. The actuator assembly of claim 1, wherein the cup body of the conductive member is formed with a number of cutouts, such that the cup body is not of a uniform thickness.

8. The actuator assembly of claim 1, wherein the conductive member is formed with a first section and a second section, wherein the first section includes a rim of the conductive member cup body and is produced from a first material with relatively high conductivity, and wherein the second section includes the conductive member cup base and is produced from a second material with relatively high durability, the second material having a lesser atomic mass than the first material.

9. The actuator assembly of claim 8, wherein the first material is copper, and wherein the second material is either titanium or tungsten.

10. The actuator assembly of claim 1, wherein the insulator plate extends laterally beyond the exterior surface of the conductive member cup body such that a step is formed by the portion of the insulator plate that is disposed outward of the exterior surface of the cup body, and wherein the first end of the housing body is formed with a notch structured to receive the step formed by the insulator plate.

* * * * *